H. B. MILLER.
VEHICLE.
APPLICATION FILED FEB. 26, 1917.

1,285,773.

Patented Nov. 26, 1918.
4 SHEETS—SHEET 1.

INVENTOR
Harris B. Miller
By W. W. Williams ATTY.

H. B. MILLER.
VEHICLE.
APPLICATION FILED FEB. 26, 1917.

1,285,773.

Patented Nov. 26, 1918.
4 SHEETS—SHEET 2.

INVENTOR
Harris B. Miller
BY W. W. Williamson ATT'Y

H. B. MILLER.
VEHICLE.
APPLICATION FILED FEB. 26, 1917.
1,285,773.
Patented Nov. 26, 1918.
4 SHEETS—SHEET 3.
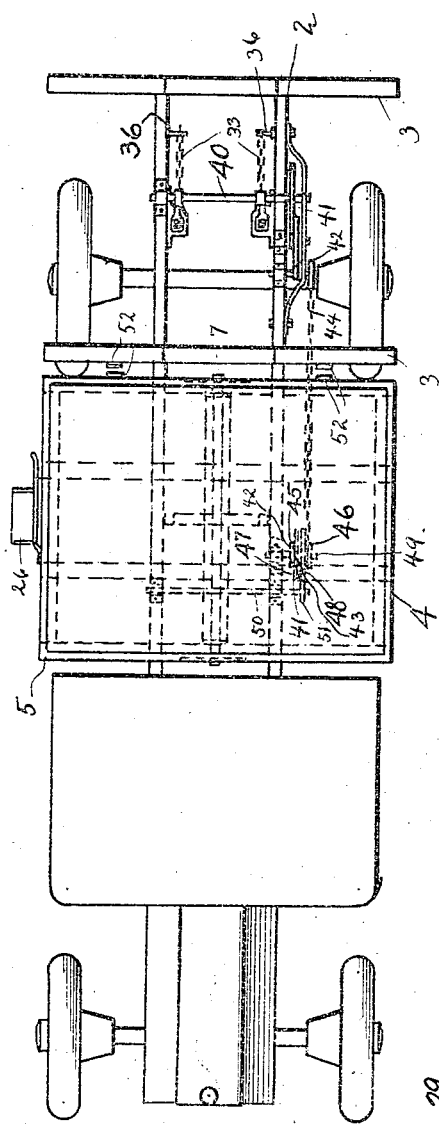
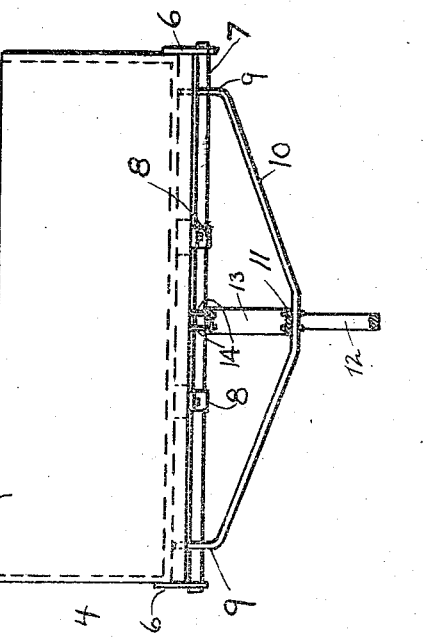
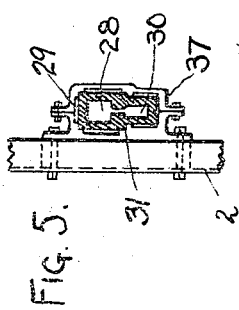
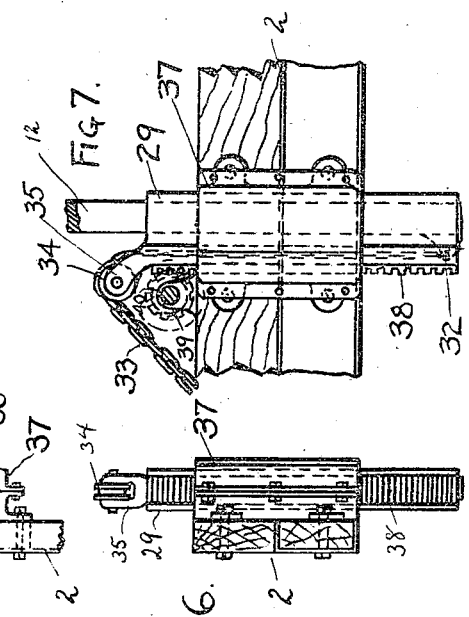
INVENTOR.
Harris B. Miller
BY W. W. Williamson ATTY H. B. MILLER.
VEHICLE.
APPLICATION FILED FEB. 26, 1917.
1,285,773.
Patented Nov. 26, 1918.
4 SHEETS—SHEET 4.
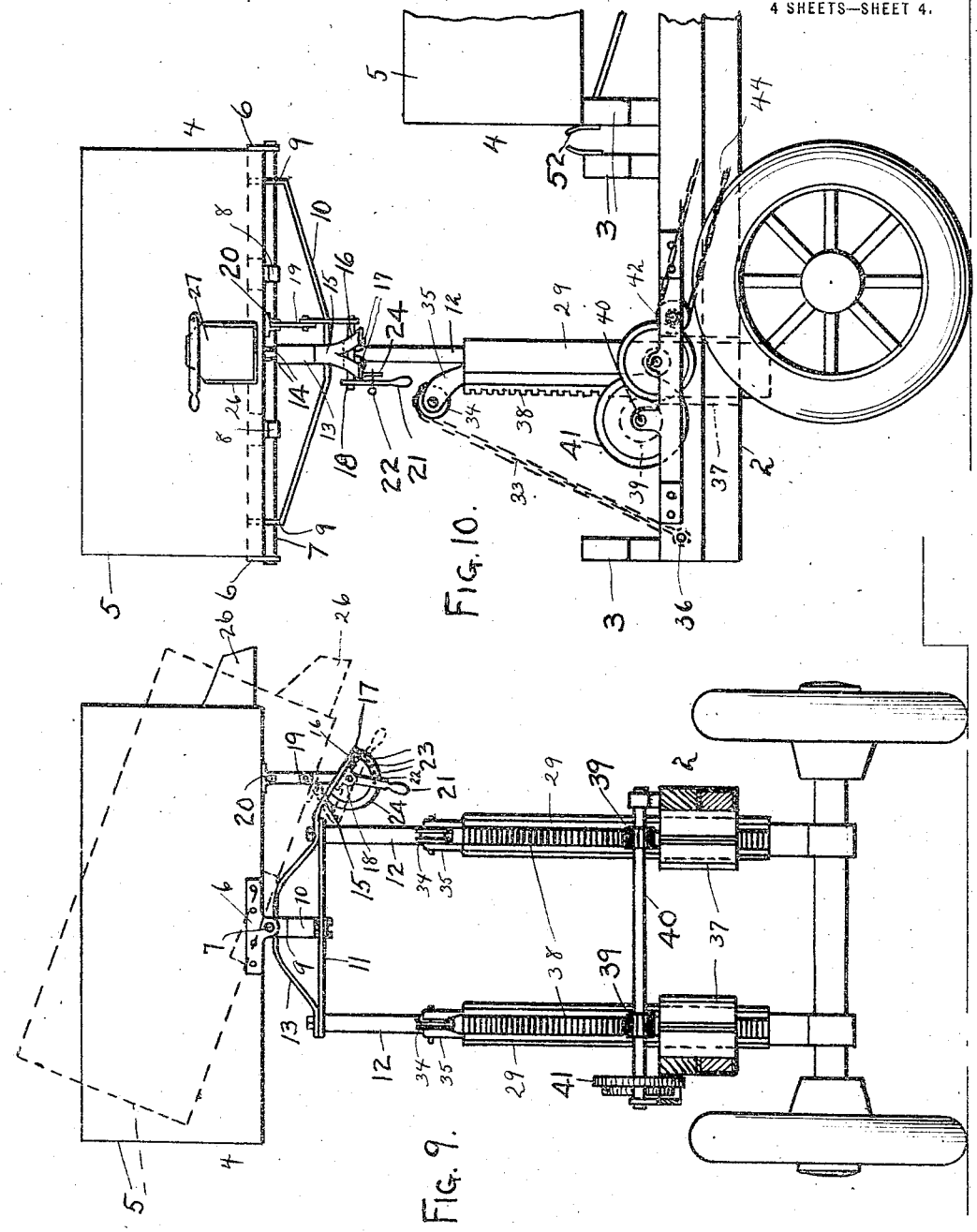
INVENTOR.
Harris B. Miller
BY W. H. Williamson ATTY.

UNITED STATES PATENT OFFICE.

HARRIS B. MILLER, OF PHILADELPHIA, PENNSYLVANIA.

VEHICLE.

1,285,773. Specification of Letters Patent. Patented Nov. 26, 1918.

Application filed February 26, 1917. Serial No. 150,935.

*To all whom it may concern:*

Be it known that I, HARRIS B. MILLER, a citizen of the United States, residing at Philadelphia, in the county of Philadelphia and State of Pennsylvania, have invented new and useful Improvements in Vehicles, of which the following is a specification.

My invention relates to new and useful improvements in vehicles and more particularly to that class of vehicles in which the body is hoisted for dumping the load and has for its object to provide a device of this character wherein a plurality of bodies are mounted upon the vehicle frame or chassis, each of which may be hoisted independently and inclined transversely, to permit the dumping of the load from the side of the vehicle, thereby overcoming the necessity of backing the vehicle to a curb which often blocks traffic for considerable periods.

A further object of the invention is to provide a vehicle with a plurality of bodies, independent means for hoisting each of said bodies, and independent adjustable means for inclining said bodies so that their contents will run out through the unloading spout.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this specification, in which—

Fig. 4, is a plan view of the vehicle with one of the bodies removed.

Fig. 5, is an enlarged fragmentary plan view of one of the frame or chassis sides, showing the hoist guide or box attached thereto with the sliding sleeve illustrated in section.

Fig. 6, is an edge view of a portion of the hoist.

Fig. 7, is a side elevation of the hoist, a portion of the chain and standard being broken away.

Fig. 8, is an enlarged side elevation of one of the bodies with portions of the supporting frame shown in section.

Fig. 9, is an enlarged detail view of the hoisting and tilting or inclining mechanism portions of the vehicle being left out to clearly illustrate the construction; and Fig. 10, is an enlarged fragmentary side elevation of the vehicle.

Figure 1:
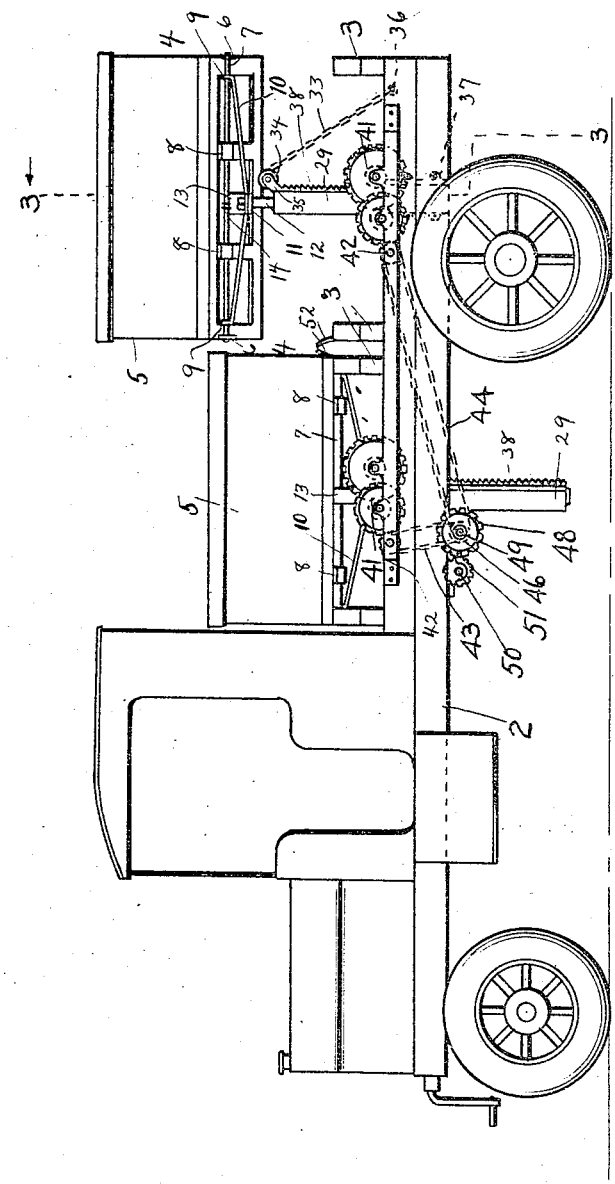
Figure 1, is a side elevation of a vehicle made in accordance with my improvement, showing one of the bodies raised.
Figure 3:
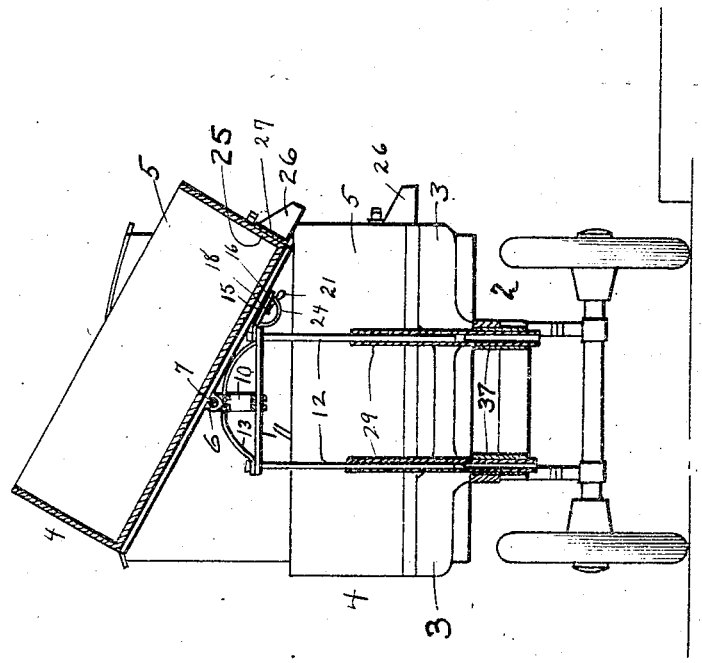
Fig. 3, is a section on the line 3—3 of Fig. 1, looking in the direction of the arrow.
Figure 2:
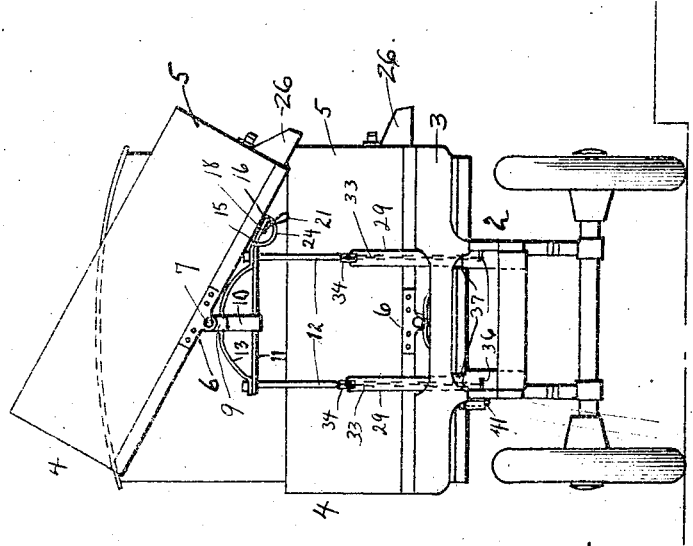
Fig. 2, is a rear end view thereof, showing the raised body slightly higher and tilted to a greater angle.

In carrying out my invention as here embodied, 2 represents a vehicle frame such as the chassis of an automobile, as here shown, but I do not limit myself to the use of an automobile, as a vehicle of any convenient construction may be utilized, and to this frame or chassis are secured a number of cross bars or rests 3 which are arranged in pairs and spaced apart to receive and support each body in its lowered position.

The bodies 4, a number of which are carried by the vehicle frame or chassis and arranged end to end, each comprises a box 5 provided with a hanger or depending bracket 6 at each end, in which are mounted the ends of the shaft 7, the latter being further supported by braces 8.

This shaft 7 is journaled, intermediate its ends and at two separated points, in the upwardly projecting arms 9 of the supporting member 10, the central portion of the latter being attached to the central part of the reach bar 11, the ends of said reach bar being secured to the upper ends of the standards 12 which form a part of the hoisting mechanism to be hereinafter described.

Resting on and secured at the ends of the reach bar 11 is a strut 13, the central portion of which rises and underlies the shaft 7, and to this central portion of the strut are secured a number of staples or journal loops 14 which partially surround the shaft 7. One end of the strut 13 is provided with an extension 15, the free or outer end of which is bifurcated as at 16. To this bifurcated end of the extension are secured suitable bearings 17 for the shaft 18 of the tilting or inclining mechanism, both ends of said shaft projecting beyond the edges of the extension 15. To one end of the shaft 18 is secured one end of the toggle lever 19, the opposite end of the toggle lever being suitably pivoted as at 20 to the box of the vehicle body, while to the other end of the shaft 18 is secured an operating handle 21, and said handle is held in any adjusted position by a pin 22, which is inserted in the desired one of a number of holes 23 in a quadrant 24, secured to the underside of the extension 15 as plainly shown in Fig. 9.

The box 5 of the vehicle body is provided at one or its near side with an outlet opening 25, from which projects a spout 26, and said outlet opening is suitably closed by a door 27 usually of the lifting slide type. If the load in the vehicle is to be delivered at a point some distance from the vehicle, then a chute (not shown) of ordinary construction is used and one end placed at the mouth of the spout.

Each body is elevated by an independent hoisting mechanism consisting of two hoists, one of which is situated at each side of the vehicle frame, so that they operate in pairs. These hoists each comprises a standard 12 slidably mounted in the standard chamber 28 of the sleeve or casing 29. This sleeve is also provided with a chain channel 30 parallel with the standard chamber 28, and in communication therewith by means of a narrow passageway 31, through which projects a lug 32 formed on the lower end of the standard 12.

One end of a chain 33 is attached to said lug and passes through the chain channel, then over a grooved pulley 34 which is journaled between the integral arms 35 of the sleeve 29, and the other end is rigidly fastened to some suitable part of the vehicle frame or chassis as at 36.

The sleeve 29 is slidably mounted in a guide or box 37, preferably made in two parts, as shown, and secured to the sides of the vehicle frame and said sleeve is provided along one edge with a vertical rack 38 with which meshes a rack pinion 39. The rack pinions of each pair of coacting hoists are mounted upon a common shaft 40 journaled in suitable bearings, and on one end, preferably the end at the off side of the vehicle, is mounted one of the gears of the windlass 41.

The windlass may be operated by a crank in the ordinary and well known manner or where the vehicle is of the self propelled type, as here shown, the motive power of the vehicle may be utilized for actuating the windlass to raise the body.

For each body there is a separate windlass and each of these windlasses is provided with a sprocket wheel 42, a chain 43 running over the sprocket wheel of one windlass and another chain 44 running over the sprocket wheel of the other windlass. These chains also run over other sprocket wheels 45 and 46 respectively, the sprocket wheel 45 being fixed to the gear wheel 47 and the sprocket wheel 46 being fixed to the gear wheel 48 and these gear and sprocket wheels are revolubly and slidably or loosely mounted upon the stationary axle 49.

On the power shaft 50 of the motor (not shown) which drives the vehicle is mounted a gear wheel 51, which either of the gear wheels 47 and 48 may be caused to engage by sliding the latter along their axle, and when so engaged, power from the motor will be transmitted to either of the windlasses for raising either of the bodies.

When either of the gear wheels 47 and 48 is in mesh with the gear wheel 51, its fixed sprocket wheel is in alinement with the sprocket wheel of its respective windlass.

The operation of my improved vehicle is as follows:—

The different bodies of the vehicle are loaded with the contents to be transported, while said bodies are in their lowered positions resting upon the cross bars 3, after which the vehicle is driven to its destination, and where the contents are to be delivered to the cellar or lower floor of a building setting back from the curb line of a street, the vehicle is stopped at the curb line pointing in the direction of travel of the traffic along that side of the thoroughfare. One of the bodies is then raised by applying power to the windlass of this body's hoist, which causes the shaft 40 to revolve in the proper direction for raising the sleeve 29, and as the outer end of the chain 33 is rigidly fastened to a portion of the vehicle frame, the raising of the sleeve will shorten the inner ends of said chain, thereby drawing the standards 12 out of the sleeves, and it will be noted that this construction and operation of the hoist produces a multiple speed raising mechanism similar in action to multiple speed gearing.

After the body is raised the desired height, the box is tilted transversely by forcing the operating handle 21 outward to "break" or "bend" the toggle lever 19 as shown by dotted lines in Fig. 9, and after the box is tilted to the proper inclination, the pin 22 is inserted in one of the holes 23 of the quadrant 24 to prevent retrograde movement of the operating handle 21, and thereby holding the box in its adjusted positions.

Where the contents of the box is such as will readily run through the outlet opening, the ordinary chute may be employed to convey the contents from the spout to the window of the building, as said chute will be on an incline, the degree of which will be determined by the height of the body with relation to the point of delivery, but the body may be tilted a sufficient degree to permit practically the entire contents of the box to reach the outlet opening.

When the body is returned to the frame or bed of the vehicle, said body will be guided to its proper resting place upon the cross bars 3 by means of arcuate guide fingers 52 projecting upwardly from certain or all of the cross bars 3, but these guide fingers are really only needed on the cross bars at the meeting ends of the adjacent bodies, so as to prevent said bodies from coming too close together.

A vehicle constructed in the manner herein described may be driven to its destination, and without turning around or backing up the load may be readily and quickly delivered, and since it is unnecessary to back the vehicle to the curb, only the width thereof is presented to the travel of traffic which the great length of a vehicle often blocks or hinders.

Having a plurality of bodies the vehicle may transport portions of the load to different destinations, or the entire load in sections to the same destination, and the load may be all of one kind of material or different kinds of material.

Of course I do not wish to be limited to the exact details of construction as herein shown, as these may be varied within the limits of the appended claims without departing from the spirit of my invention.

Having thus fully described my invention, what I claim as new and useful, is—

1. In a device of the character stated a vehicle frame, a plurality of bodies arranged end to end on said frame, a hoisting mechanism for each of said bodies, said hoisting mechanism consisting of two hoists each comprising a guide or box, a sleeve slidably mounted in said box, said sleeve provided with a longitudinal standard chamber, and chain channel in communication throughout their entire length through a narrow passageway, a rack formed along one side edge of the sleeve, arms at the top of said sleeve, a grooved pulley journaled to said arms, a shaft, a rack pinion on said shaft and in mesh with the rack of the sleeve, a standard slidably mounted in the standard chamber of the sleeve, a lug formed with the inner end of said standard projecting through the passageway in the sleeve into the chain channel, a chain passing over the grooved pulley, then into the chain channel with one end attached to the lug of the standard and the opposite end rigidly fastened to some stationary object, a reach rod connected with the outer or upper ends of the standards of one hoisting mechanism, a strut overlying said reach rod, a supporting member attached to the reach bar, depending brackets attached to the box of each body, and a shaft mounted in said brackets and journaled in the ends of the supporting member whereby the bodies may tilt transversely.

2. In a device of the character stated, a frame, a plurality of bodies arranged end to end on said frame, a hoisting mechanism for each of said bodies and including standards in, combination with a reach rod connected with the upper ends of the standards of each hoisting mechanism, a strut overlying said reach rod, a supporting member attached to the reach rod, depending brackets attached to each body and a shaft mounted in said brackets and journaled in the ends of the supporting member for hingedly supporting the bodies on their respective hoisting mechanisms.

3. In a device of the character stated, a frame, a plurality of bodies arranged end to end on said frame, a hoisting mechanism for each of said bodies and including standards in combination with a reach rod connected with the upper ends of the standards of each hoisting mechanism, a strut overlying said reach rod, a supporting member attached to the reach rod, depending brackets attached to each body, a shaft mounted in said brackets and journaled in the ends of the supporting member for hingedly supporting the bodies on their respective hoisting mechanisms, the aforementioned strut having a bifurcated extension, bearings carried by said extension, a shaft journaled therein with both ends projecting beyond the edges of the extension, one end adapted to be engaged by a suitable operating handle and a toggle lever connected with the opposite end of the shaft and one of the bodies for the purpose specified.

In testimony whereof, I have hereunto affixed my signature.

HARRIS B. MILLER.